United States Patent [19]

Flynn

[11] 4,042,317
[45] Aug. 16, 1977

[54] DIRECT FLAME APPARATUS FOR DRYING CAN COATINGS

[75] Inventor: Edward S. Flynn, New Rochelle, N.Y.

[73] Assignee: Flynn Burner Corporation, New Rochelle, N.Y.

[21] Appl. No.: 630,350

[22] Filed: Nov. 10, 1975

[51] Int. Cl.$^2$ .............................................. F27D 3/12
[52] U.S. Cl. ..................................... 432/124; 118/47; 432/77
[58] Field of Search .................. 118/47; 432/124, 146, 432/222, 77, 230; 34/DIG. 13, 104, 105, 68; 431/349; 427/223, 224, 225

[56] References Cited

U.S. PATENT DOCUMENTS

| | | | |
|---|---|---|---|
| 2,289,354 | 7/1942 | Gardner | 432/124 X |
| 2,795,411 | 6/1957 | Court | 432/230 |
| 2,796,164 | 6/1957 | Hakogi | 34/105 X |
| 3,050,297 | 8/1962 | Walter | 432/230 X |
| 3,437,322 | 4/1969 | Flynn | 432/222 |
| 3,627,283 | 12/1971 | Hittner | 432/230 |
| 3,962,213 | 6/1976 | Flynn | 427/224 |

*Primary Examiner*—Dorsey Newton

[57] ABSTRACT

Direct-flame apparatus for drying coatings applied to the outer surface of metal cans. The apparatus includes a conveyor adapted to advance the cans in a continuous train through a tunnel having a series of direct-flame assemblies mounted therein, whereby each can in the course of its advance is progressively heated by the assemblies to cause the cans to emerge from the tunnel in a dried state. Each assembly is constituted by a gas-fed burner element and a hood placed thereover, the element emitting a sheet of flame which impinges on the coated surface and is flanked by curtains of air issuing from the hood at a velocity serving to confine the applied heat within a limited sector of the can and to prevent flashing of the coating despite the high temperature of the flame impinging thereon.

11 Claims, 9 Drawing Figures

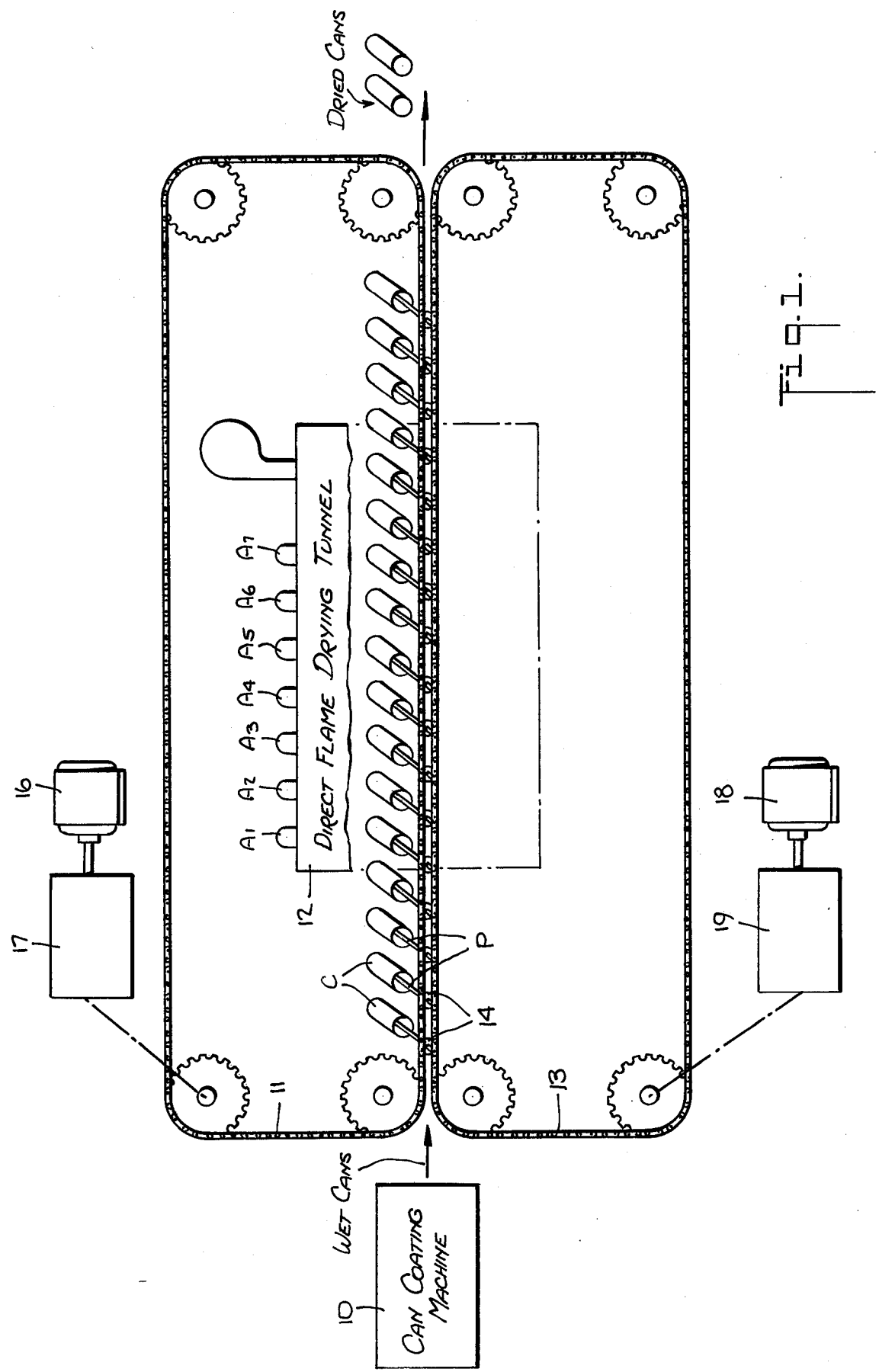

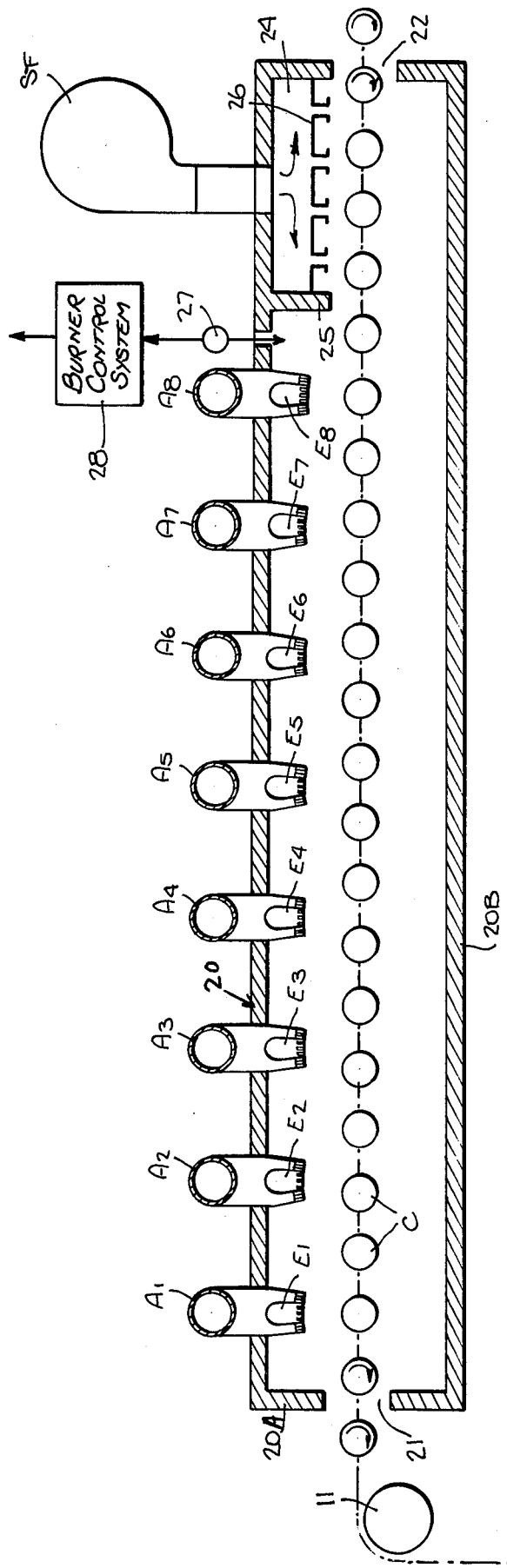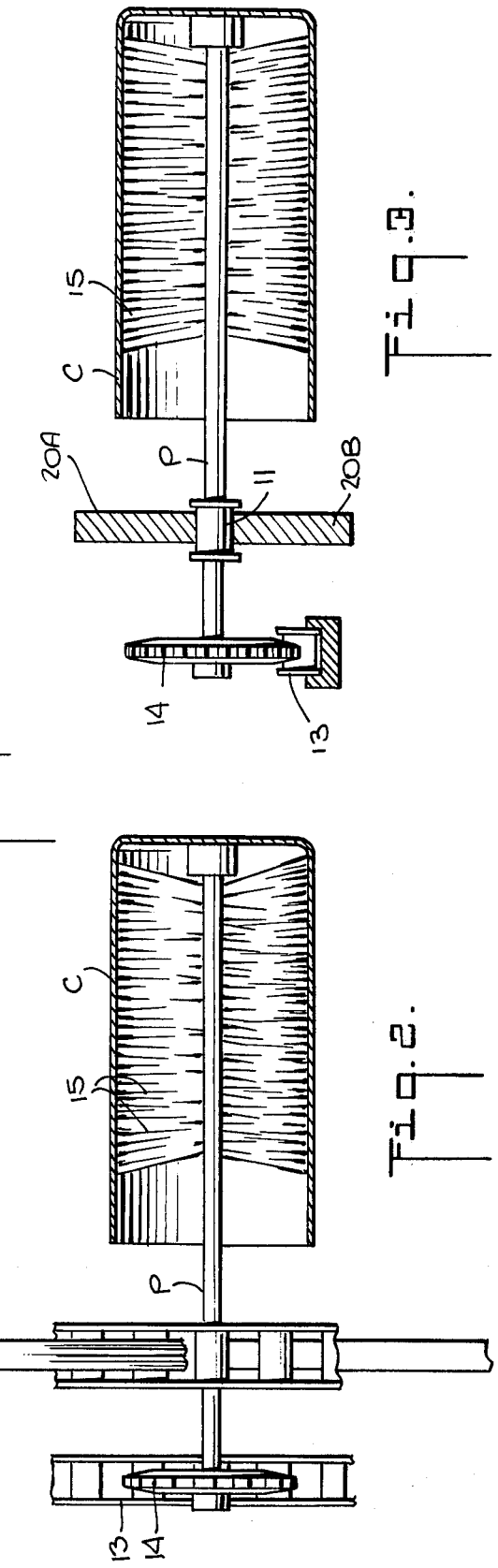

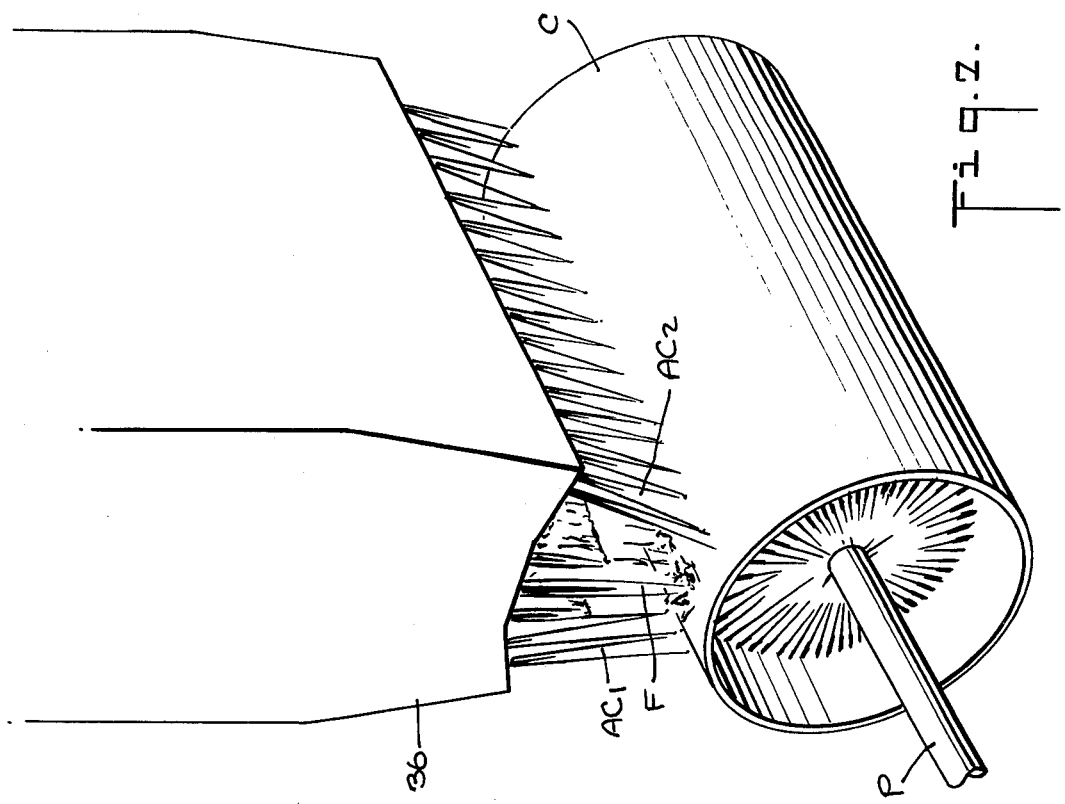
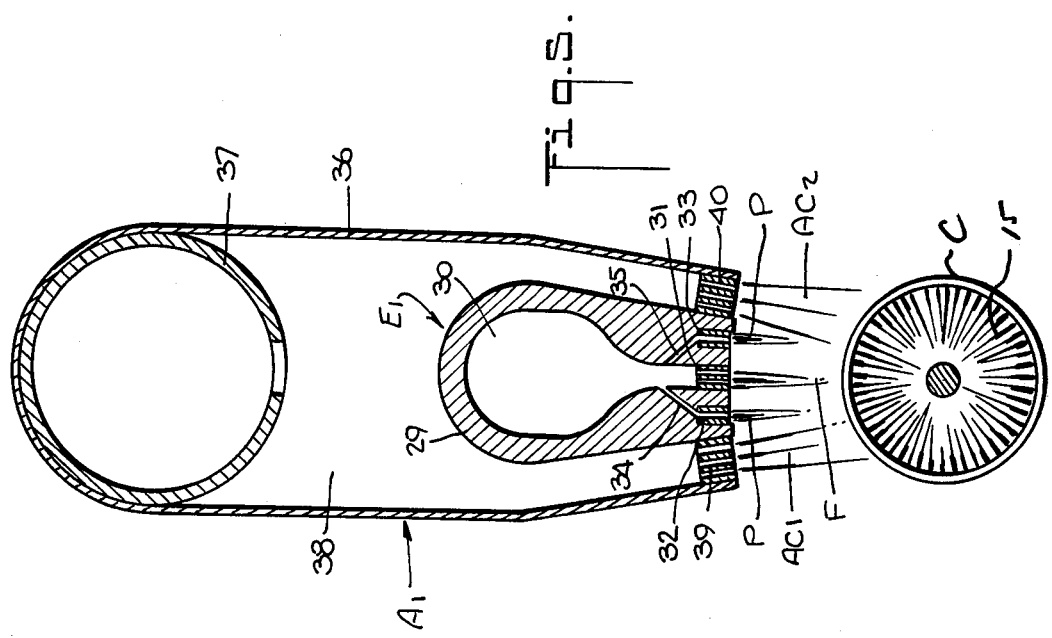

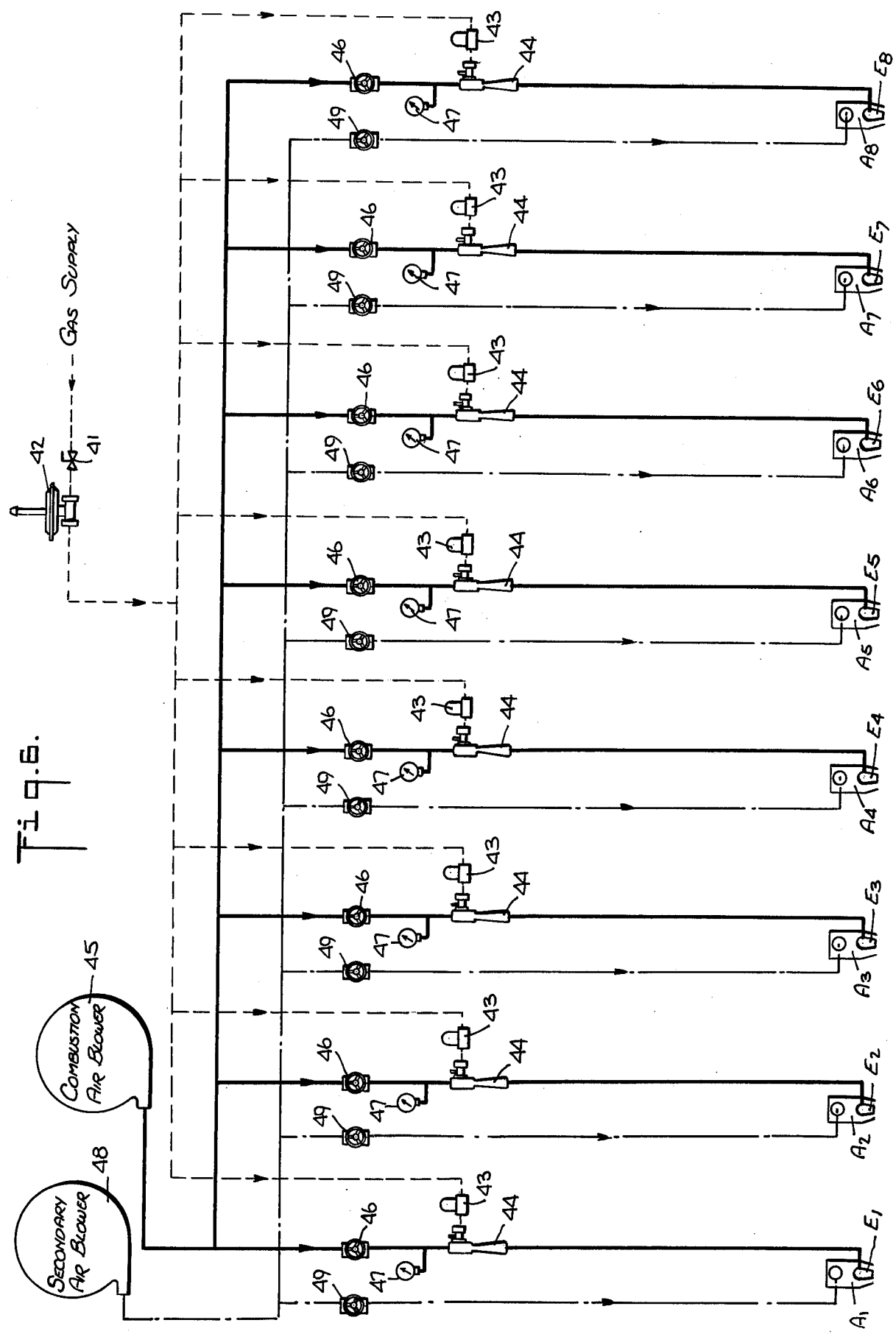

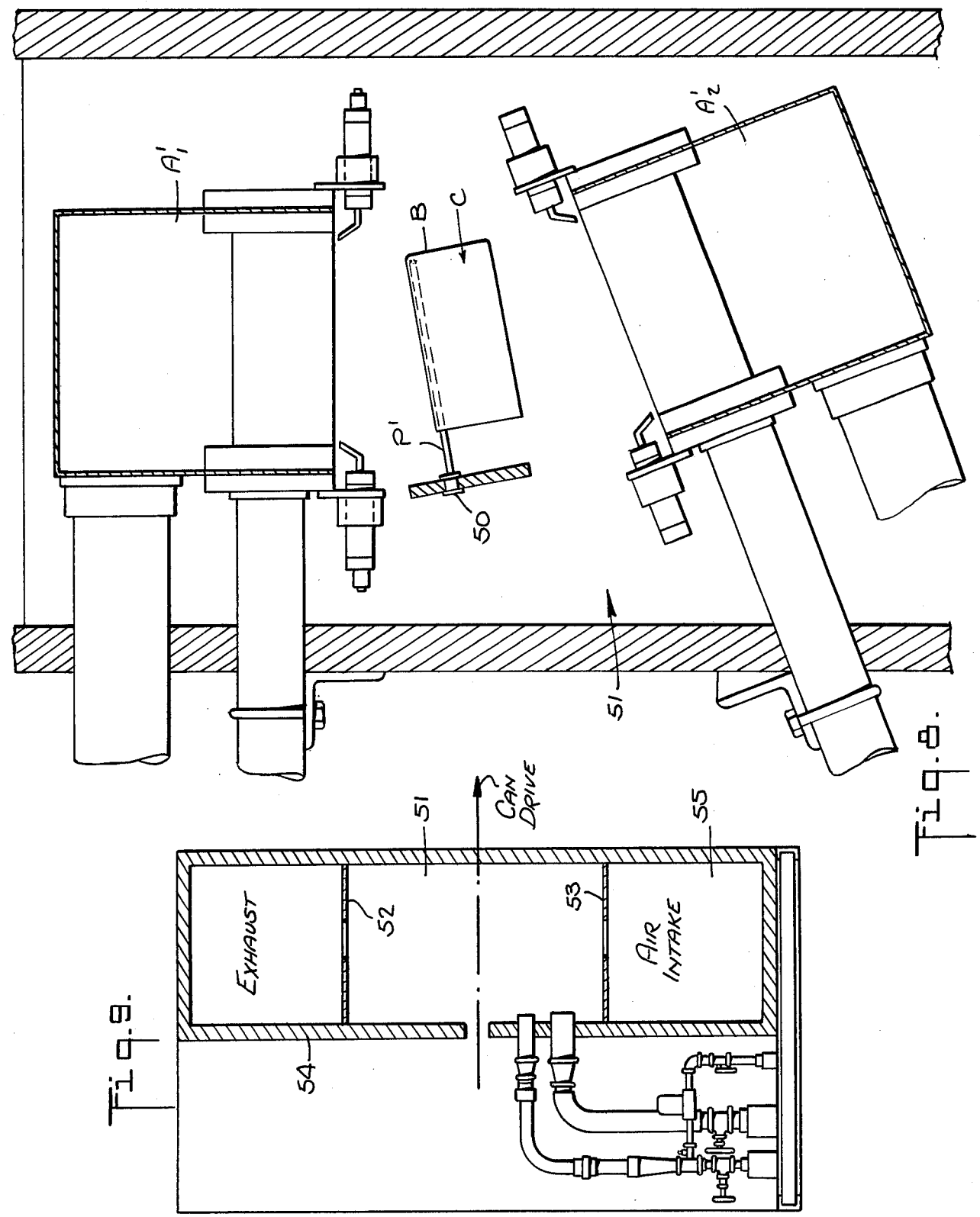

DIRECT FLAME APPARATUS FOR DRYING CAN COATINGS

BACKGROUND OF INVENTION

This invention relates generally to techniques for drying lacquer, ink and other coatings applied to the outer surface of cylindrical metal cans, and more particularly to apparatus for rapidly and efficiently drying such coatings by the direct application of a gas flame thereto.

Metal cans for beverages, food and other products are now mass-produced at exceptionally high rates. Many commercially-produced cans are fabricated by drawing and ironing a metal blank formed of aluminum or steel in a multiphase operation, thereby avoiding the need for seaming. But before the cans are filled and a lid bonded thereto, it is customary to protectively coat and decorate the outer surface thereof. Such coatings are usually in three layers, the first being a base coat which is a uniform white or ground color. The second layer is the print coat in which printed and decorative matter is laid over the base coat. (In some instances, the print coat is applied directly to the metal can.) Finally, a third layer is applied, whose purpose is to protect the print layer, this overcoat being a clear lacquer.

The coatings are generally of the lacquer type which dry or cure by evaporation of the volatile components. The film-forming constituent is usually a high molecular weight polymer, such as a polyester. Other types of lacquer coatings are based on acrylic resins. The solvents used are generally of the low-boiling type, such as aromatics.

The term "coating" as used herein is intended to encompass any protective lacquer, decorative layer, printing ink or any other material applied in the wet state on the surface of the can.

It is essential, after each coating is laid down on the can surface, that it be dried to specifications. In some instances, the coatings must be thoroughly dried, in which event even the slightest tackiness is objectionable. In other cases, some residual wetness is acceptable. To this end, it has heretofore been the practice in order to achieve a high-production rate, to convey a continuous train of cans on a conveyor chain through an elongated oven in which the chain travels up and down through a sinuous path to lengthen the exposure time of the cans to the heat without unduly extending the length of the oven.

The heat supplied to such ovens is in indirect form in that air is first heated by a gas-flame burner external to the oven chamber and then blown into the oven at an elevated temperature sufficient to dry the fresh coatings on the cans passing therethrough but well below the ignition point of the coatings. The drying time is, of course, a function of the oven temperature.

One must be careful to maintain the temperature within the oven at a level below which the coating will catch fire. Moreover, since the cans remain in the oven for a relatively long period, one must be careful that the oven temperature is not so high as to anneal the cans when aluminum is used as the can metal. On the other hand, the volatilized solvents exhausted from the oven cannot be discharged directly into the atmosphere, for they may be noxious and highly polluting. Hence with existing ovens, it is the practice to provide after-burners to burn off or precipitate the solvent vapors.

The existing indirect-heating technique for drying can coatings is inherently inefficient and wasteful in terms of energy expenditure. The heat to volatilize the solvents is derived from the heated atmosphere of the oven, whereas the heat to elevate the temperature of this atmosphere is derived from a gas-flame heater. Only a fraction of the thermal energy supplied by the gas-flame heater is exploited, for most of this energy is dissipated in heating a huge volume of air. Thus with one known type of oven for drying can coatings, as much as 4 million BTU's of thermal energy are expended in the course of one hour, only a portion of which actually serves to carry out the can drying operation.

The sharply rising cost of combustible gas renders the operation of existing types of drying ovens increasingly expensive. But this is not the only objectionable factor, for the scarcity of combustible gas makes it vital to conserve the available supply thereof, and an oven wasteful of gas cannot be tolerated. Furthermore, because gas is currently in short supply, one dare not expand existing can-drying facilities, for fear that gas may not be available for the enlarged operation.

It would therefore appear to be distinctly advantageous from the standpoint of the efficient utilization of the available supply and to best conserve energy to apply the flame directly to the surface of the cans, rather than to air which in turn serves to dry the can surface. But it has not heretofore been possible to use a direct-flame technique for drying wet coatings, for this would result in ignition and in uncontrolled burning resulting in the destruction of the coatings.

SUMMARY OF THE INVENTION

In view of the foregoing, it is the main object of this invention to provide improved apparatus for drying coatings applied to cylindrical cans, which apparatus makes use of a highly efficient direct flame-drying technique.

A salient feature of the invention resides in the fact that to dry the coating only a very brief heat-exposure period is entailed, and even though the coatings are subjected to a much higher temperature than with the indirect-heating technique, the cans, when made of aluminum, are in no danger of annealing. Thus with an indirectly-heated technique in which the oven temperature is in the order of 400° to 425° Fahrenheit, because of the prolonged period of exposure, annealing of aluminum cans is a problem, whereas with the present direct-flame technique in which the flame temperature is about 2100° F, this problem does not arise.

Another object of the invention is to provide a direct-flame machine for drying freshly-coated cans, which machine is relatively compact and requires far less plant space than an indirectly-heated oven capable of drying the same number of cans per minute (typically, 600 to 800 cans per minute).

A major advantage of a direct-flame drying machine in accordance with the invention is that it more fully utilizes the available energy and therefore effects major economies in the expenditure of combustible gas. Thus, for a given supply of gas, it becomes possible to expand can drying facilities and to produce a far greater output for a given combustible gas supply as compared to the output of existing types of drying ovens. A further advantage of the invention is that the flame-impingement technique also cuts down the production of noxious vapors so that the exhaust of the machine may safely be discharged into the atmosphere without extensive treatment of the effluent.

Also an object of the invention is to provide direct-flame drying apparatus wherein all operating parameters are controllable and can be adjusted to dry different types of can coatings at the optimum drying rate to produce dried coatings of high quality.

Briefly stated, these objects are attained in an apparatus for drying a wet coating on the surface of cans, the apparatus including a conveyor for advancing the cans in a continuous train through a tunnel having a series of direct-flame burner assemblies mounted therein. Each can in the course of its advance through the tunnel is progressively heated by the assemblies to cause the cans to emerge from the tunnel in a dried state.

Each burner assembly in the series thereof is constituted by a gas-fed burner element emitting a sheet of flame which impinges on the coated surface of the advancing can, a hood being placed over the burner element to provide on either flank of the flame a curtain of air at a velocity serving to confine the heat within a limited sector of the can and to prevent flashing of the coating despite the high temperature of the flame impinging thereon.

OUTLINE OF THE DRAWINGS

For a better understanding of the invention as well as other objects and further features thereof, reference is made to the following detailed description to be read in conjunction with the accompanying drawings wherein:

FIG. 1 is a block diagram of one preferred embodiment of a direct-flame apparatus in accordance with the invention;

FIG. 2 is a plan view of the can conveyor included in the apparatus;

FIG. 3 is a side view of the can conveyor;

FIG. 4 is a longitudinal section taken through the tunnel included in the apparatus;

FIG. 5 is a section taken through one of the gas-flame assemblies;

FIG. 6 is a schematic diagram of the air-gas piping system associated with the assemblies;

FIG. 7 shows the relationship between a can and the flame impinging thereon;

FIG. 8 is a section taken through the drying tunnel of a second preferred embodiment of a can-drying apparatus in accordance with the invention; and FIG. 9 shows in section the air exhaust arrangement associated with this drying tunnel.

DESCRIPTION OF INVENTION

The Drive System (First Embodiment)

Referring now to FIG. 1, there is shown an apparatus in accordance with the invention adapted to dry coatings applied to the cylindrical surface of freshly-coated cans C emerging from a coating machine 10. The nature of this machine forms no part of the present invention. In a situation in which several coatings are successively applied to a can, the apparatus is arranged to dry each coating and to cool the dried coating before returning the can to the coating machine for the next coating.

Cans C from the coating machine are fed by a suitable transfer mechanism onto the rotatable pins P of an endless chain conveyor 11 which functions to advance the cans in a continuous train through a direct-flame drying tunnel 12. As the cans travel on conveyor 11, they are caused simultaneously to rotate by means of an endless sprocket chain 13 which is engaged by sprocket wheels 14 attached to the inner ends of the pins.

The means by which cans C are rotated as they are advanced is separately illustrated in FIGS. 2 and 3, where it will be seen that each P carried by conveyor chain 11 and extending laterally from both sides thereof supports a can C on the outer end, the inner end of the pin having a sprocket wheel 14 keyed thereon.

Sprocket wheel 14 engages sprocket chain 13 and is turned thereby. The can-supporting end of pin P is provided with flexible bristles to form a brush 15 which resiliently engages the inner surface of the can and serves to hold the can concentrically with respect to the pin. The mounting of the cans on the conveyor pins and the withdrawal of the cans therefrom may be effected by a transfer mechanism having a vacuum adapted to engage the bottom wall of the cans.

Rotation of pins P while the cans are being advanced on conveyor chain 11 and the rate and direction of such rotation depends on differential movement of chains 11 and 13. When both chains travel in the same direction and at exactly the same speed, sprocket wheel 14 is inactive, but when a difference therebetween in speed or in direction takes place, then wheel 14 is caused to rotate clockwise or counterclockwise at a rate which is a function of this difference.

In order to adjust the speed at which the train of cans C is advanced through the tunnel, conveyor chain 11 is driven by a motor 16 through a variable-speed gear train 17 or other speed control means. And in order to adjust the directions and rate of pins P, chain 13 is driven by a motor 18 through a variable speed gear train 19. Thus these operating parameters are adjustable to meet particular can drying requirements.

The Drying Tunnel

Referring now to FIG. 4, there is schematically shown the direct-flame drying tunnel 12, the tunnel being provided with a thermally-insulated elongated enclosure 20 having a rectangular cross-section. The pin-borne cans C rotating on conveyor chain 11 enter the tunnel through an inlet 21 and exit therefrom through an outlet 22. The drying tunnel is formed from separate upper and lower half sections 20A and 20B to provide a longitudinal slot, as shown in FIG. 3, through which conveyor chain 11 passes, so that the cans move within the tunnel, whereas sprocket wheel 14 and chain 13 associated therewith for controlling can rotation lie outside the tunnel.

Mounted on the top wall of tunnel 20 in a row extending from a point adjacent inlet 21 to a point adjacent a cooling stage 23 is a series of equi-spaced, gas-fired direct flame assemblies generally designated by letters $A_1$, $A_2$, $A_3$, $A_4$, $A_5$, $A_6$, $A_7$ and $A_8$. In practice, a greater or smaller number of flame assemblies may be used to satisfy the drying requirements.

Each assembly, as will later be explained in detail, is arranged to emit a downwardly-directed sheet of flame which impinges on the rotating can passing therebelow, the sheet of flame being flanked by air curtains serving to confine the applied heat to a limited sector of the can and to supply additional air to the heating zone to promote combustion.

The assemblies function to progressively dry the cans in the advancing train thereof in a series of steps, so that when a can reaches the cooling stage 23, it is sufficiently dried. Cooling stage 23 is provided with an air chamber 24 which is above outlet 22 and is defined by a vertical partition 25 in the tunnel and by a horizontal discharge panel 26. Chamber 24 is supplied with cooling air by a supply fan S-F, the cooling air being sprayed downwardly onto the cans advancing toward tunnel outlet 22 so that the cans emerge from the tunnel in a relatively cool condition. In practice, the cooling of the cans need not be carried out in the tunnel, but in a separate cooling stage in which jets of air are directed at the cans in appropriate directions.

While the direct-flame assemblies are shown mounted on the top wall of the tunnel to direct the flames downwardly, in practice the reverse arrangement may be used, with the flames directed upwardly. Also, to accelerate the drying process, the direct-flame assemblies may be arranged in staggered relation above and below the advancing train of cans.

The burners are adjustable so that the amount of heat supplied in the series of drying steps is appropriate to the nature of the coating and acts to effect adequate drying thereof. To assure proper adjustment of the burners, an infra-red sensor 27 is located outside the tunnel, the sensor being optically arranged with respect to the tunnel interior to detect the level of heat therein. The output of the sensor is applied to an electronic control system 28 adapted to automatically adjust the valves for controlling the gas-mixture supplied to the burner assemblies to maintain the optimum level of heat.

In practice, in addition to the cooling stage within the tunnel, the dried cans emerging from the tunnel may be subjected to a cooling air blast before transfer thereof is effected from the conveyor. While not shown in FIG. 4, the drying tunnel is provided with an exhaust system to maintain the ambient temperature therein at a relatively cool level, the exhaust system removing the evaporated solvents and controlling the ambient temperature of the tunnel to promote an efficient drying action.

The Direct Flame Assembly

As shown separately in FIG. 5, each assembly $A_1$, $A_2$, etc., includes a burner element $E_1$, $E_2$, etc., having a longitudinally extending casing 29 forming an internal chamber 30. This chamber is supplied with a gas-air mixture to sustain a main flame F as well as pilot flames p on either side thereof. This mixture is constituted by a combustible hydrocarbon gas and compressed air.

Internal chamber 30 communicates with a main flame slot and a pair of pilot flame slots, each containing a stack of corrugated ribbons. These ribbon stacks define the main flame port 31 and the pilot flame ports 32 and 33. The pilot flame ports are supplied with the air-gas mixture through ducts 34 and 35.

The ribbon stacks in the main and pilot flame ports create an array of spaced jet openings through which the gas-air mixture is forced. The configuration of the ribbons is such as to provide two distinct types of jet ports, one being the main flame jet port 31 which is of the high-velocity type, causing the gas-air mixture to project with sufficient energy to form a long flame extending to a point remote from the burner.

Pilot jet ports 32 and 33 are of the low-velocity type to produce relatively short pilot flames for sustaining the long main flame. Because of the longitudinally-extending slot arrangement, the projected main flame assumes a sheet-like form. In practice, instead of providing separate ribbon stacks and ports for producing the main and pilot flames, these stacks may be integrated within a common port.

Burner elements of the type shown in FIG. 5 are disclosed in greater detail in Flynn U.S. Pat. Nos. 2,499,482; 2,521,988 and 3,499,720. As explained in these patents, the gas emerging from the high-velocity jets has a velocity greater than the rate of flame propagation of the gas, so that this main flame would not continue in the absence of a pilot flame to support combustion.

Placed over burner element $E_1$ is a hood 36 having a U-shaped cross-section within which is contained a longitudinally-slotted casing 37. This casing is supplied with secondary air which is fed into an air chamber 38 surrounding burner element $E_1$ and is projected through ports 39 and 40 on either side of burner element $E_1$.

Ports 39 and 40 are provided with corrugated ribbon stacks forming an array of jet openings, whereby projected from these ports at a high velocity are laminar air curtains $AC_1$ and $AC_2$. These air curtains flank main flame F on either side thereof. In practice, one may omit casing 37 and supply secondary air directly into hood 36.

Piping System

Referring now to FIG. 6, there is shown the piping arrangement by which an air-gas combustible mixture is supplied to burner elements $E_1$ to $E_8$ of the assemblies $A_1$ to $A_8$ respectively, and by which secondary air is supplied to the hoods of the assemblies for creating the air curtains flanking the burner flames.

Gas for all of the assemblies is supplied thereto through a main valve 41 in series with a gas governor 42, the governor output being connected through a solenoid gas valve 43 to one input of a mixer 44 into whose other input there is fed primary air. The primary or combustion air for all of the assemblies is supplied by a combustion air blower 45. The amount of primary air fed into each mixer 44 is adjustable by means of a primary air valve 46, the prevailing air pressure being indicated by a gauge 47.

Secondary air for assemblies $A_1$ to $A_8$ to produce the air curtains is supplied thereto by a secondary air blower 48. Each secondary air line has a valve 49 interposed therein so that one can adjust the air velocity of the air curtains.

Thus, the ratio of primary air to combustible gas fed into the mixers is adjustable, as well as the level of secondary air fed into the assemblies, whereby these parameters may be set to satisfy existing requirements. While manual valves are shown, it will be appreciated that all valves may be of the automatic type under the control of an automatic process control system reponsive to the various process variables (temperature, air velocity, conveyor speed, type of coating, etc.) to maintain optimum operating conditions.

Also, suitable interlocks may be provided to shut off the flames should the can conveyor movement be halted for any reason, or to arrest the conveyor should the flames be cut-off for any reason.

Drying Operation

As shown in FIG. 7, in connection with a single direct-flame assembly, the outer surface of can C is subjected to a sheet of flame F, the sides of which are flanked by air curtains $AC_1$, and $AC_2$.

Because the flame and air curtain positions are stationary, whereas can C is both advancing and rotating, the flame impinges on the surface of the can and the heat thereof is confined by the air curtains to a limited sector of the can. However, this sector, because of the can movement, is constantly changing so that the flame never dwells on any fixed zone on the wet coated surface of the can.

As a consequence, even though the intense heat of the flame would ordinarily be more than sufficient to ignite the coating, this does not occur, for the flame is never in contact with any given zone or sector on the coating for a period long enough to raise the temperature thereof to the ignition point. Indeed, while the flame at the zone of impingement causes a rapid rise in the temperature of the coating to promote evaporation of the solvent therein, this temperature never reaches the ignition point, for the same heated zone, because of the can movement, is almost immediately subjected to the quenching action of the air curtains.

Or to express this somewhat differently, the thermal dynamics are such as to subject the wet coating to intense heat causing almost immediate volatilization of the solvent, yet even through the solvent is of the low-boiling type, flashing thereof is inhibited by the air curtains. The efficiency of the direct flame technique is exceptionally high, for the thermal energy supplied by the burner elements to the cans is almost fully exploited in carrying out the drying operation, and relatively little energy is wasted in non-productive activity.

While in the machine described herein, the cans are both rotated and advanced, it is possible to carry out direct-flame drying without rotating the cans, for as long as the cans move with respect to the burners, the direct flame does not, at any time, dwell on the coating and ignition thereof is avoided. But where the cans are not rotated, it may be necessary to advance them at a greater rate than when they are rotated.

Also, while with most wet coatings it is essential that the flame be flanked with air curtains to prevent ignition, with certain types of ink compositions having a high flash point, air curtains may not be necessary, or, where still necessary, the amount of secondary air required may be much less than with other compositions.

Second Embodiment

In the first embodiment of the invention disclosed hereinabove, cans C passing through the drying tunnel are supported and centered on brushes carried on horizontally-extending pins, so that the longitudinal axis of each can lies in a horizontal plane. In some instances, particularly where there are high purity requirements, this conveyor arrangement may be objectionable in that hairs or particles from the brush may break off and lodge within the can. Moreover, should a pin-borne brush travel through the tunnel without a can thereon due to an improper can-loading operation, the naked brush will then be subjected to direct flames from the assemblies and may be singed or destroyed.

To avoid the need for brushes, in the second embodiment of the drying apparatus disclosed in FIG. 8, pins P', which extend from a chain conveyor 50 travelling through a drying terminal 51, are upwardly tilted to form can hangers. Thus when a wet-coated can C is applied thereto, pin P' lies against the inner cylindrical wall of the can, the free end of the pin abutting the can bottom B. The can, in this arrangement, hangs from the pin and because its longitudinal axis is now upwardly inclined, the can cannot fall off.

In this tunnel arrangement, a row of burner assemblies, including assembly $A'_1$, is arranged within the tunnel above the advancing cans, and a row of burner assemblies in staggered relation to the upper row, including assembly $A'_2$, is arranged within the tunnel below the advancing cans.

Because the conventional can has the greatest concentration of metal at the junction of its cylindrical shell and its disc-shaped bottom B, this junction area behaves as a heat-sink and absorbs more thermal energy than the rest of the can. Hence, if the flames emitted by the burner assemblies were oriented to effect a uniform distribution of thermal energy across the can, then because of the heat-sink-effect, a temperature gradient would be produced across the can and the drying action would be uneven.

To compensate for the heat-sink effect and to avoid a temperature gradient, upper assembly $A'_1$ is positioned so that its flame-emitting port lies in a horizontal plane. Consequently, the distance between the high end of inclined can C and assembly $A'_1$ is short, the distance increasing progressively as one moves toward the low or mouth end of the can where the distance is greatest.

In the case of lower assembly $A'_2$, had the assembly also been maintained with its flame-emitting port in a horizontal plane, then the relationship between the port and the can would be the very reverse of that existing for the upper assembly, for now the distance between the high end of inclined can C and the assembly would be long, not short. In this instance, therefore, to effect the same heat-sink compensation achieved by the upper assembly, lower assembly $A'_2$ is upwardly tilted to a greater degree than the upward tilt of the can, so that the distance between the high end of the can and the lower assembly is short and increases progressively as one moves toward the low end of the can.

In order to maintain a relatively cool atmosphere within drying tunnel 51 and to quickly exhaust the volatilized solvents, the tunnel is defined within a tall structure having a rectangular cross-section. This chamber is divided by an upper septum 52 and a lower septum 53 into an exhaust duct 54 above tunnel 51 and an air-intake duct 55 below the tunnel.

Thus cool air from air intake duct 55 is forced into the tunnel, and this air drives the volatilized solvent from the tunnel into exhaust duct 54, suitable blowers and exhaust fans being provided for this purpose.

It must be recognized that if the volume and velocity of the exhaust is inadequate, a build-up of heat might result within the tunnel, causing the wet coating to flash rather than to dry. Hence these parameters must be set to satisfy prevailing can-drying conditions. In practice, a sensor system may be provided responsive to the temperature within the tunnel to effect automatic control of the exhaust system to maintain a desired ambient temperature level.

In this arrangement, the tunnel inlet and outlet are just large enough to permit the passage of the cans so that relatively little heat escapes therefrom into the surrounding area. Heat exchangers associated with the tunnel exhaust may be used to extract heat therefrom for recycling in the drying apparatus.

While there have been shown and described preferred embodiments of a direct flame apparatus for drying can coatings in accordance with the invention, it will be appreciated that many changes and modifications may be made therein without, however, departing from the essential spirit thereof.

I claim:

1. Apparatus for drying wet coatings applied to the outer surface of cylindrical cans comprising:

A. a drying tunnel having a series of assemblies mounted therein at spaced positions; and
B. conveyor means to advance the cans through said tunnel in a continuous train, whereby each can passes the series of assemblies, said conveyor means being constituted by an endless chain having upwardly tilted pins extending therefrom from which said cans are hung whereby the bottom of each can occupies a higher position in said tunnel than the mouth thereof, each of said assembles including a direct flame burner element supplied with a combustible air-gas mixture to project a main flame in sheet form which impinges across the outer surface of an advancing can and means including a source of secondary air to project air curtains with sufficient velocity to flank both sides of said flame and to impinge across said surface to confine the intense heat of said flame to a limited sector on the advancing can and to prevent ignition of the coating despite said intense heat, said assemblies being arranged to apply more heat to the bottom end of the cans than to the mounts thereof to compensate for the temperature gradient created by the heat sink effect produced by the bottom end.

2. Apparatus as set forth in claim 1, wherein said tunnel includes a cooling chamber provided with means for blowing cooling air onto the cans leaving the last of the series of assemblies.

3. Apparatus as set forth in claim 1, wherein said direct-flame burner element includes a casing having a longitudinally-extending slot to define a chamber which communicates with a main flame port and with a pilot flame port on either side of the main flame port.

4. Apparatus as set forth in claim 3, wherein said ports each contain a stack of corrugated ribbons to define an array of jet openings.

5. Apparatus as set forth in claim 3, wherein said means to project air curtains which flank both sides of the main flame includes a hood placed over the burner element and communicating with a supply of secondary air, said hood being provided with output ports on either side of said burner element to project said air curtains.

6. Apparatus as set forth in claim 5, wherein said output ports are each provided with a stack of corrugated ribbons to form an array of jet openings.

7. Apparatus as set forth in claim 1, further including means associated with each assembly to adjust the ratio of air-to-gas so that the combustible air-gas mixture supplied to each of said assemblies is separately adjustable, whereby the amount of thermal energy produced by each assembly may be set so as to progressively dry the coating on a can passing through the tunnel.

8. Apparatus as set forth in claim 1, wherein said coating is composed of lacquer having a volatile solvent and each of said assemblies includes means to adjust the heat supplied by said element to a level sufficient to volatilize the solvent without ignition.

9. Apparatus as set forth in claim 1, wherein said coating is formed of three layers and said cans are passed through said tunnel after each coating is applied, further including means to cool the dried cans before a subsequent coating is applied.

10. Apparatus as set forth in claim 1, wherein each of said assemblies is oriented with respect to said tilted cans so that the distance between the high end of the can and each assembly is short and increases progressively as one moves to the low end thereof to compensate for said temperature gradient.

11. Apparatus as set forth in claim 1, wherein said tunnel includes a series of assemblies above and below the advancing cans, the assemblies above the cans being staggered with respect to the assemblies below the cans.

* * * * *

UNITED STATES PATENT OFFICE
CERTIFICATE OF CORRECTION

Patent No. 4,042,317     Dated August 16, 1977

Inventor(s) Edward S. Flynn

It is certified that error appears in the above-identified patent and that said Letters Patent are hereby corrected as shown below:

Column 4, line 5 "each P" should have read -- each pin P --

Column 4, line 16 "vacuum adapted" should have read -- vacuum chuck adapted --

Column 7, line 20 "through" should have read -- though --

Column 9, line 23 "mounts" should have read -- mouths --

Signed and Sealed this

Twenty-second Day of November 1977

[SEAL]

Attest:

RUTH C. MASON
Attesting Officer

LUTRELLE F. PARKER
Acting Commissioner of Patents and Trademarks